United States Patent [19]

Kasten

[11] Patent Number: 4,696,582
[45] Date of Patent: Sep. 29, 1987

[54] THREE MEMBER DRAWER SLIDE WITH SEQUENTIAL MOVEMENT

[75] Inventor: Donald A. Kasten, Pomona, Calif.

[73] Assignee: Standard precision, Inc., Santa Fe Springs, Calif.

[21] Appl. No.: 923,210

[22] Filed: Oct. 27, 1986

[51] Int. Cl.4 ............................................. F16C 29/04
[52] U.S. Cl. ..................................................... 384/18
[58] Field of Search ....................... 384/18, 19, 21, 22, 384/49, 17; 312/341 R

[56] References Cited

U.S. PATENT DOCUMENTS 3,658,398 4/1972 Abbate et al. ......................... 384/21
4,469,384 9/1984 Fler et al. .............................. 384/18
4,537,450 8/1985 Baxter .................................. 384/18
4,549,773 10/1985 Papp et al. ............................ 384/21

Primary Examiner—Lenard A. Footland
Attorney, Agent, or Firm—Edgar W. Averill, Jr.

[57] ABSTRACT

An improved three member drawer slide having a drawer slide, an intermediate member and a cabinet slide. The three member slide moves sequentially so that the cabinet slide extends completely before the drawer slide begins its extension. This sequential movement extends the life of the three member slide. The sequential movement is brought about by a releasable gripping action between the drawer member and the intermediate member.

15 Claims, 14 Drawing Figures

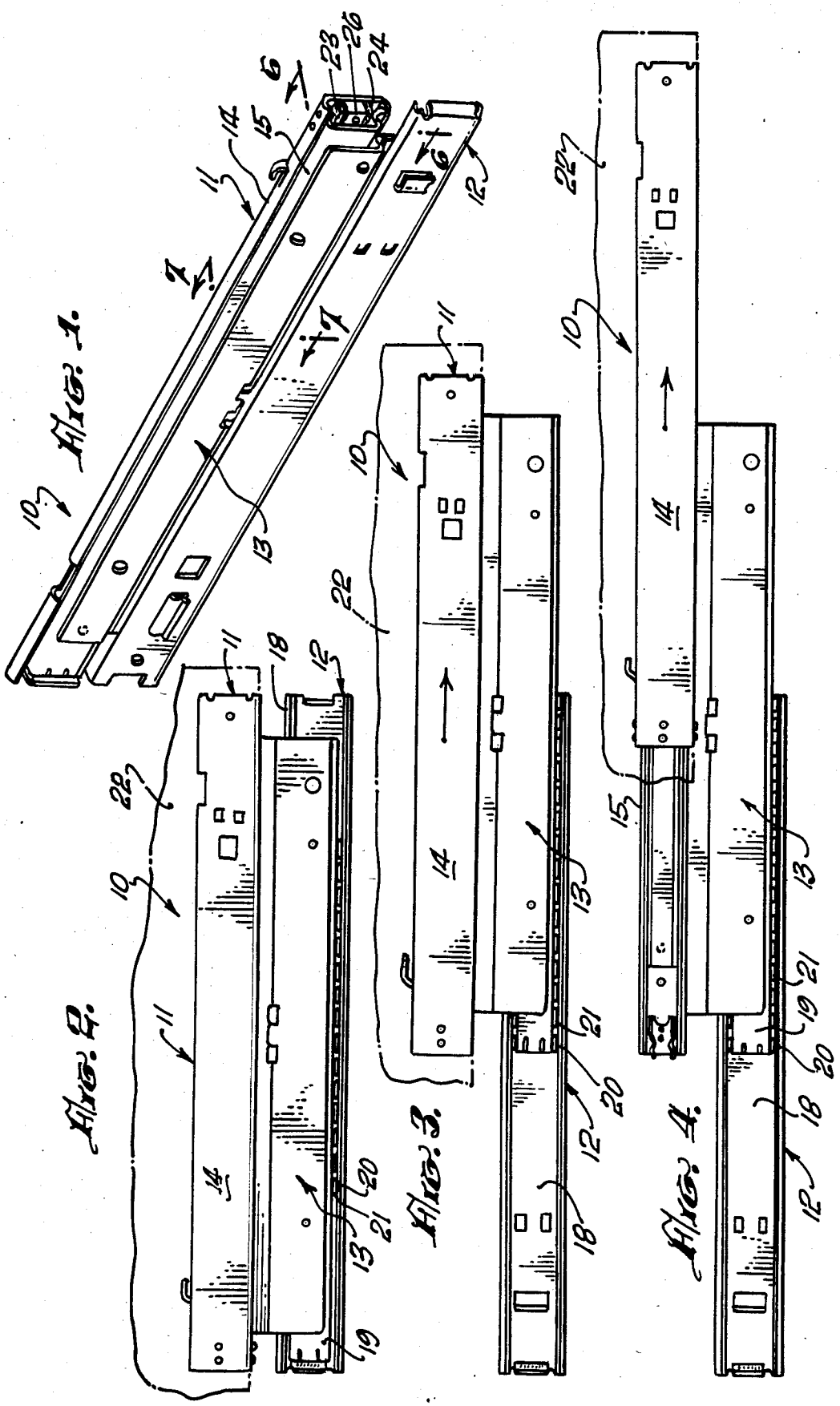

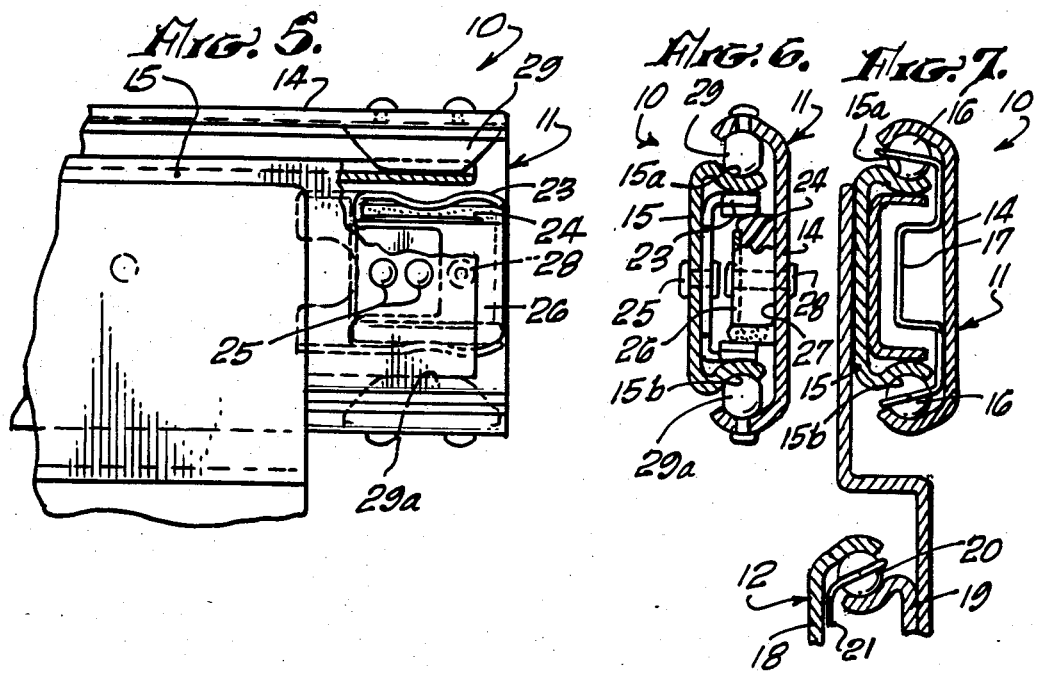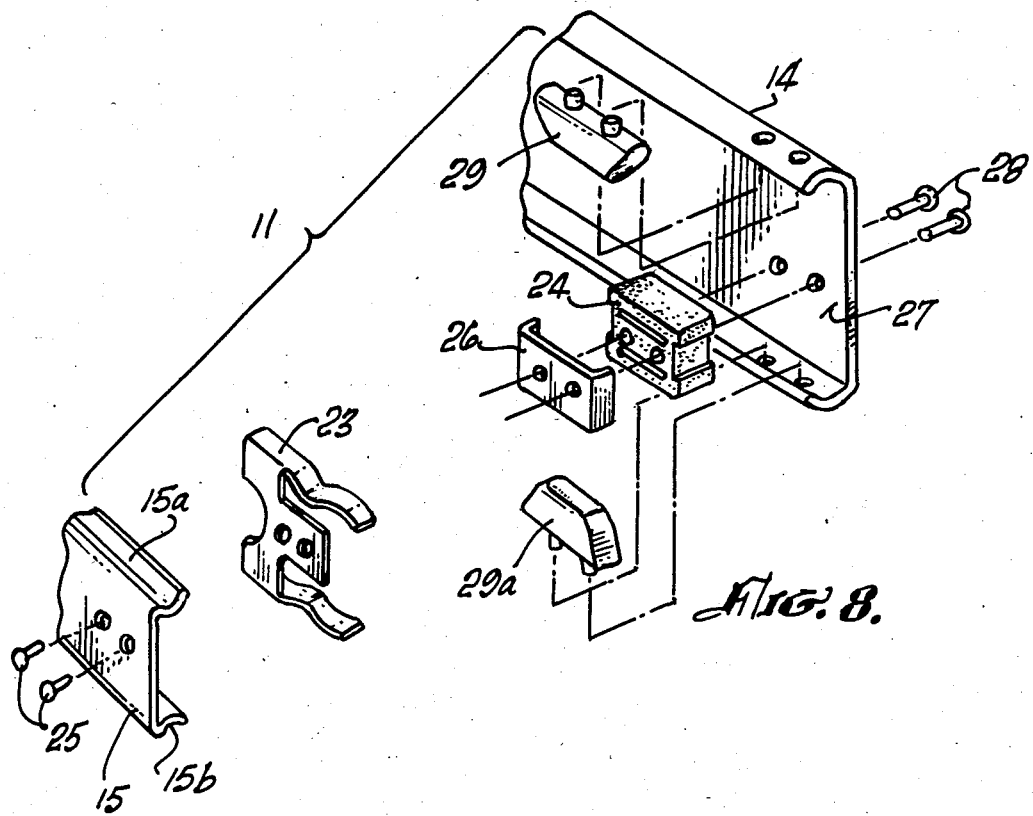

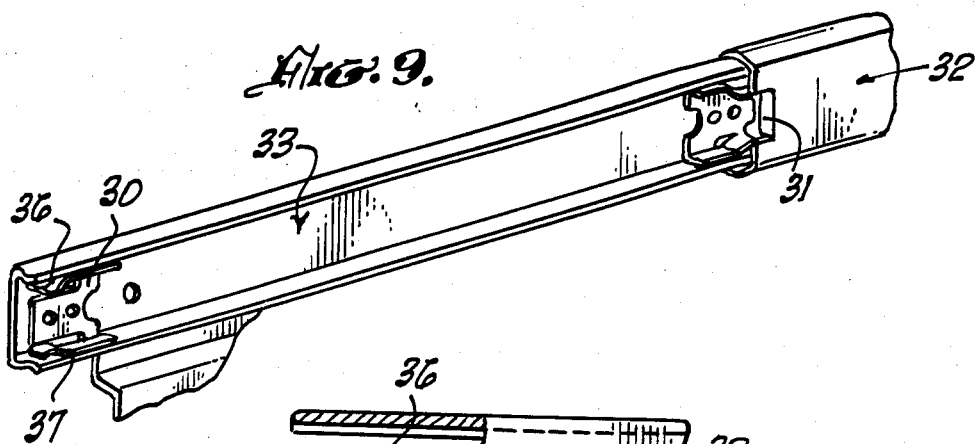
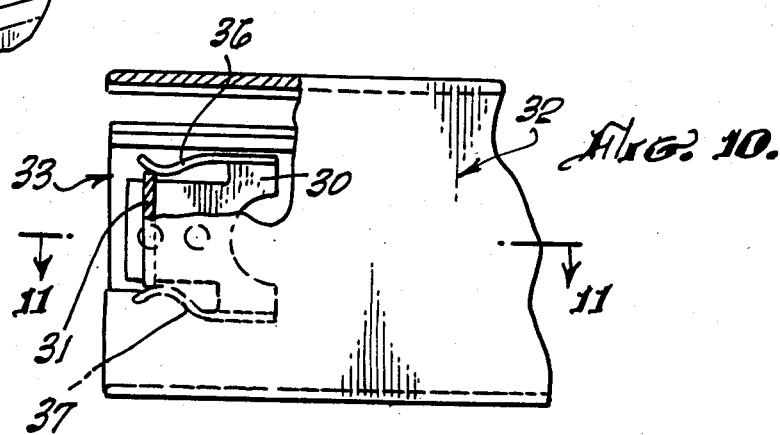
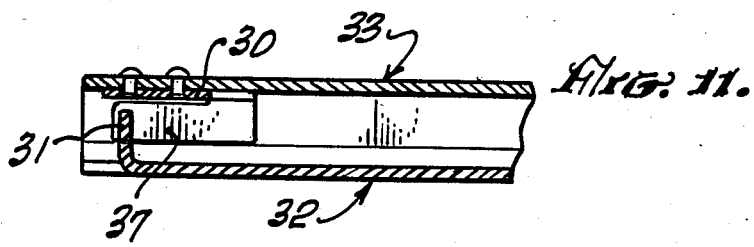
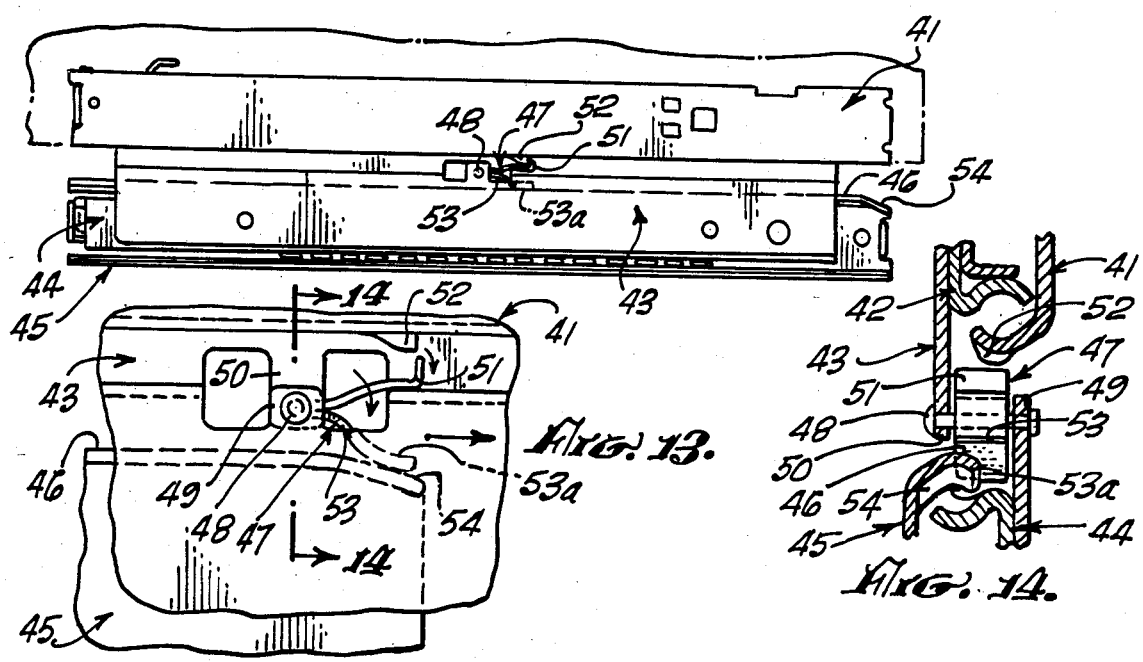

THREE MEMBER DRAWER SLIDE WITH SEQUENTIAL MOVEMENT

BACKGROUND OF THE INVENTION

The field of the invention is hardware and the invention relates more particularly to linear motion devices of the type commonly referred to as drawer slides. Precision ball bearing slides of the type shown in U.S. Pat. No. 3,205,025 utilize three standardized components comprising an outer member, a ball retainer with ball bearings and an inner member.

Typically, one of the slide members is affixed to a cabinet and the other to a drawer. In order to increase the extension of one member with respect to the other, three member drawer slides have been developed which permit full extension of the drawer from the cabinet. One configuration of a three member slide is shown in U.S. Pat. No. 3,778,120. This three member slide includes essentially two separate slides with the inner members of each slide affixed to an intermediate member so that the slide affixed to the drawer is above the slide affixed to the cabinet. A second configuration of fully extendable slides is constructed by fastening the outer web of two inner slide members and affixing one outer slide member to a cabinet and the other outer slide member to a drawer. A third configuration has a large outer slide member which has a first inner slide member which not only has a ball bearing groove on its outer edge cooperating with the large outer slide, but also has an inner facing ball bearing groove cooperating with a second inner slide member. After an extended period of use under heavy loads, even high quality slides can fail at the track of the slide member affixed to the cabinet. It has been noted that when a three member drawer slide is heavily loaded and either of the two slides is free to move that it will tend to move in a manner least adapted for long life. That is, the cabinet-mounted slide of a three member drawer slide will be extended last putting the maximum amount of strain on the outer slide member adjacent the ball retainer of the cabinet slide member.

SUMMARY OF THE INVENTION

It is, thus, an object to provide a drawer slide which will extend the cabinet-mounted slide completely before the drawer-mounted slide is permitted to extend.

The present invention is for an improved three member drawer slide of the type having a drawer slide affixed to an intermediate member and a cabinet slide positioned below the drawer slide affixed also to the intermediate member. The drawer slide has a drawer slide outer member, a drawer slide inner member and said drawer slide has a plurality of ball bearings held by an upper ball bearing retainer. The lower slide has a cabinet slide outer member, a cabinet slide inner member and a plurality of ball bearings held by a lower ball retainer. The improvement comprises means to cause the movement of the cabinet-mounted slide to occur before the movement of the drawer-mounted slide. The means comprises releasable gripping means between the drawer slide member and the intermediate member. The releasable gripping means performs a gripping action only when the drawer member is fully retracted and the cabinet member is more free to move outwardly with respect to the intermediate member than the drawer member. Thus, when the three member drawer slide is opened from a fully retracted position, the drawer member and intermediate member will move outwardly completely before the drawer member will move with respect to the intermediate member. The gripping means can be either a frictional gripping means between a spring member and a block or can be a releasable latch.

BRIEF DESCRIPTION OF THE DRAWINGS

FIG. 1 is a perspective view of the improved three member drawer slide of the present invention.

FIG. 2 is a side view thereof showing the assembly in retracted configuration.

FIG. 3 is a side view thereof showing the three member drawer slide assembly of FIG. 1 in a partially extended configuration.

FIG. 4 is a side view of the three member drawer slide assembly of FIG. 1 in a fully extended configuration.

FIG. 5 is an enlarged view, partly broken away, showing one configuration of gripping means of the three member drawer slide of FIG. 1.

FIG. 6 is an enlarged cross-sectional view taken along line 6—6 of FIG. 1.

FIG. 7 is an enlarged cross-sectional view taken along line 7—7 of FIG. 1.

FIG. 8 is an exploded, perspective view of the gripping means of FIG. 5.

FIG. 9 is a perspective view of an alternate embodiment of gripping means of the three member drawer slide of FIG. 1.

FIG. 10 is an enlarged side view, partly broken away, of the releasable gripping means of FIG. 9.

FIG. 11 is a cross-sectional view taken along line 11—11 of FIG. 10.

FIG. 12 is a side view of an alternate embodiment of gripping means of the drawer slide of FIG. 1.

FIG. 13 is an enlarged side view of the gripping means of the slide of FIG. 12.

FIG. 14 is an enlarged cross-sectional view taken along line 14—14 of FIG. 13.

DESCRIPTION OF THE PREFERRED EMBODIMENTS

The improved three member drawer slide of the present invention is shown in perspective view in FIG. 1 and indicated generally by reference character 10. The three members referred to consist of an drawer slide 11, a cabinet slide 12 and an intermediate member 13. Drawer slide 11 has an outer member 14, an inner member 15 and a plurality of ball bearings 16 (see FIGS. 6 and 7) held in a ball retainer 17. Similarly, cabinet slide 12 has an outer member 18 and an inner member 19, between which are a plurality of ball bearings 20 held in a ball retainer 21.

A drawer 22 is shown in FIGS. 2 through 4 and would be affixed to the outer member 14 along the face shown in FIG. 2. That is, drawer 22 is affixed to drawer member 14 and cabinet member 18 is affixed to the cabinet wall. It has been found that the life of the three member drawer slide can be extended about twenty-five percent by causing retainer 21 to move outwardly before retainer 17 moves outwardly. In that way, the weight of drawer 22 is held closer to the center of retainer 21 than if the drawer slide member were allowed to extend first. It has also been noted that if both the drawer slide and the cabinet slide are unrestricted, that the drawer slide will tend to extend first, thereby decreasing slide life.

In order to cause the cabinet slide 12 to extend first, releasable gripping means are positioned between the drawer slide outer member 14 and the intermediate member 13. One portion of this gripping means is shown in FIG. 4 and comprises a spring clip 23 which grips an elastomeric block 24 shown in FIGS. 5 and 8. As shown best in exploded view in FIG. 8, spring clip 23 is held to drawer slide inner member 15 by a pair of rivets 25. Elastomeric block 24 is held to drawer slide outer member 14 by a plate 26 which is secured over block 24 and holds it against the inner surface 27 by a pair of rivets 28. A pair of elastomeric guide blocks 29 and 29a ride in the grooves 15a and 15b of inner member 15 and help to retain it in alignment with respect to outer member 14. In operation, as the three member drawer slide 10 is fully retracted, spring clip 23 grips elastomeric block 24, as shown in FIG. 5, and tends to hold the outer member 14 with respect to intermediate member 13 as well as with respect to inner member 15. Thus, as one pulls outwardly on drawer 22, the outer slide member 14 tends to pull inner member 15, intermediate member 13 and inner member 19 outwardly until inner member 19 is fully extended with respect to its outer member 18 as shown in FIG. 3. At this point, further outward movement of the drawer releases the spring clip 23 from elastomeric block 24 and permits the outer member 14 to move outwardly with respect to its inner member and the intermediate mmember. In this way, the two slides move in a sequential manner with the cabinet slide extending first, rather than in the reverse order or haphazardly. In this way, it has been found that the three member slide has an increased life of approximately twenty-five percent.

An alternate gripping means is shown in FIGS. 9 through 11 where spring clip 30 is riveted to inner member 33 and grips a lanced tab 31 formed at the end of outer member 32. The gripping action is shown in FIGS. 10 and 11 where lanced tab 31 is held securely between the fingers 36 and 37 of spring clip 30. The details of lanced tab 31 are shown best in FIG. 11 where it can be seen that lanced tab 31 extends toward spring clip 30 and is securely held thereby.

It is, of course, not necessary that the releasable gripping means comprise a friction gripping means but, instead, a releasable latch method can be used as indicated in FIGS. 12 through 14. There, a drawer 40 is affixed to outer member 41, whose inner member 42 is secured to an intermediate member 43. Intermediate member 43, in turn, is secured to inner member 44 of the cabinet slide. Outer member 45 of the cabinet slide has an upper surface 46 which supports a pivotable arm 47 which is held by a pin 48 shown best in FIG. 14. Pin 48 is held by a pair of tabs 49 and 50 formed from intermediate member 43. Pivotable arm 47 has an upwardly extending finger 51 which abuts a lanced tab 52 when the pivotable arm 47 is in its upward position as indicated in FIG. 12. As the intermediate member 43 has moved outwardly with respect to the outer member 45 of the cabinet slide, it drops downwardly as its lower leg 53 reaches drop off 54 which is an inclined terminus of the upper surface 46 of outer member 45. Alternatively, the lower leg 53 can simply extend past the end of the outer member 45 rather than to have a drop off 54. As shown in FIG. 13, this downward movement causes the upwardly extending finger 51 to move away from tab 52 and permits the outer member 41 to move outwardly. This, of course, occurs only after the cabinet slide is completely extended, thereby providing the desired sequencing. By fabricating pivotal arm 47 from spring steel, an especially effective assembly results since the upwardly extending finger can readily snap over tab 52 without damaging pivotable arm 47 in the event that the cabinet slide is retracted before the drawer slide. Nylon or Delrin, or other polymer such as polymeric foot 53a, may be used on leg 53 as a glide to ride along the upper outer surface of outer member 46 to reduce friction.

Although the invention has been described with respect to a three member drawer slide where one slide is mounted directly over another slide, it can be adapted for other configurations. The important feature is that the members are interconnected to releasingly hold one slide member in a retracted configuration until another slide member is fully extended. In order to provide a slide which will stay in a retracted position, it is possible that both of the slide members will have gripping means, and the slide which corresponds to the drawer slide of FIG. 1 will have a more secure gripping means so that, although the slide is still held from undesired opening, it will still sequence in the proper order.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved three member drawer slide of the type having a drawer slide affixed to an intermediate member and a cabinet slide positioned below said drawer slide and affixed to said intermediate member, said drawer slide having a drawer slide outer member, a drawer slide inner member and said drawer slide having a plurality of ball bearings held by an upper ball-retainer and said cabinet slide having a cabinet slide outer member, a cabinet slide inner member and a plurality of ball bearings held by a lower ball retainer wherein the improvement comprises means to cause the movement of the lower ball retainer to occur before the movement of the upper ball retainer, said means comprising:

releasable gripping means between said drawer slide outer member and said intermediate member, said releasable gripping means performing a gripping action only when said drawer slide outer member is fully retracted and said cabinet slide outer member being more free to move outwardly with respect to said intermediate member than said drawer slide outer member when said cabinet slide outer member is retracted whereby when said three member drawer slide is extended from a fully retracted position, the cabinet slide outer member will move outwardly completely before the drawer slide outer member will move with respect to the drawer slide inner member.

2. The improved three member drawer slide of claim 1 wherein said releasable gripping means comprises a friction gripping means.

3. The improved three member drawer slide of claim 2 wherein said releasable gripping means comprises a first gripping member affixed to the drawer slide outer member and a mating gripping member affixed to the drawer slide inner member.

4. The improved three member drawer slide of claim 1 wherein said releasable gripping means comprises a first gripping member affixed to the intermediate member and the second gripping member affixed to the drawer slide outer member.

5. An improved three member drawer slide of the type having a drawer slide affixed to an intermediate member and a cabinet slide positioned below said drawer slide and affixed to said intermediate member, said drawer slide having a drawer slide outer member, a drawer slide inner member and said drawer slide having a plurality of ball bearings held by an upper ball retainer and said cabinet slide having a cabinet slide outer member, a cabinet slide inner member and a plurality of ball bearings held by a lower ball retainer wherein the improvement comprises means to cause the movement of the lower ball retainer to occur before the movement of the upper ball retainer, said means comprising:

releasable gripping means between said drawer slide outer member and said intermediate member, said releasable gripping means performing a gripping action only when said drawer slide outer member is fully retracted and said cabinet slide outer member being more free to move outwardly with respect to said intermediate member than said drawer slide outer member when said cabinet slide outer member is retracted whereby when said three member drawer slide is extended from a fully retracted position, the cabinet slide outer member will move outwardly completely before the drawer slide outer member will move with respect to the drawer slide inner member.

6. The improved three member drawer slide of claim 5 wherein said releasable gripping means comprises a pair of opposed flexible arms affixed to one of said drawer slide inner member or said drawer slide outer member and a grasped block on the other of said drawer slide outer member or drawer slide inner member.

7. The improved three member drawer slide of claim 6 wherein said block is an elastomeric block.

8. The improved three member drawer slide of claim 7 wherein said elastomeric block is affixed to said drawer slide outer member.

9. The improved three member drawer slide of claim 6 wherein said block is a metal tab.

10. The improved three member drawer slide of claim 9 wherein said metal tab is on said outer member.

11. An improved three member drawer slide of the type having a drawer slide affixed to an intermediate member and a cabinet slide positioned below said drawer slide and affixed to said intermediate member, said drawer slide having a drawer slide outer member, a drawer slide inner member and said drawer slide having a plurality of ball bearings held by an upper ball retainer and said cabinet slide having a cabinet slide outer member, a cabinet slide inner member and a plurality of ball bearings held by a lower ball retainer wherein the improvement comprises means to cause the movement of the lower ball retainer to occur before the movement of the upper ball retainer, said means comprising:

releasable gripping means affixed to said intermediate member and contacting and holding the drawer slide outer member when said drawer slide outer member is fully retracted and releasing its grip on the drawer slide outer member when said cabinet slide outer member is fully extended, whereby when said three member drawer slide is extended from a fully retracted position, the cabinet slide outer member will move outwardly completely before the drawer slide outer member will move with respect to the drawer slide inner member.

12. The improved three member drawer slide of claim 11 wherein said releasable gripping means comprises a pivotable arm held by said intermediate member between the outer members of the drawer and cabinet slides, said pivotable arm resting on the upper surface of the cabinet slide outer member and having an upwardly extending finger contacting a tab extending downwardly from the lower surface of the drawer slide outer member and said pivotable arm being positioned to fall downwardly slightly when said cabinet slide outer member is fully extended, thereby causing said upwardly extending finger to release its contact against the tab allowing the drawer slide outer member to extend from its inner member.

13. The improved three member drawer slide of claim 12 wherein said pivotable arm is formed from a length of flexible material bent over a pivot pin held by said intermediate member.

14. The improved three member drawer slide of claim 13 wherein said flexible material is spring steel.

15. The improved three member drawer slide of claim 14 wherein said length of spring steel includes a polymeric glide affixed to that portion of the spring steel length that rests on the upper surface of the cabinet slide outer member.

* * * * *

Notice of Adverse Decision in Interference

In Interference No. 102,020, involving Patent No. 4,696,582, D. A. Kasten, THREE MEMBER DRAWER SLIDE WITH SEQUENTIAL MOVEMENT, final judgment adverse to the patentee was rendered Aug. 9, 1989, as to claims 1-15.

[*Official Gazette November 21, 1989*]